United States Patent
Sunkara et al.

(10) Patent No.: US 6,173,420 B1
(45) Date of Patent: *Jan. 9, 2001

(54) METHOD AND APPARATUS FOR FAIL SAFE CONFIGURATION

(75) Inventors: Ramu V. Sunkara, Reading, MA (US); Luk S. Ho, Nashua; Paul F. Mackin, Manchester, both of NH (US); David Rowlands, Leominster, MA (US)

(73) Assignee: Oracle Corporation, Redwood Shores, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/961,793

(22) Filed: Oct. 31, 1997

(51) Int. Cl.[7] .................................................. G06F 11/00
(52) U.S. Cl. ............................................. 714/38; 395/712
(58) Field of Search .................................. 395/704, 712; 714/19, 38, 4; 709/220, 221, 222, 201, 205, 204, 206, 227, 231

(56) References Cited

U.S. PATENT DOCUMENTS

| | | | |
|---|---|---|---|
| 3,444,528 | 5/1969 | Lovell et al. | 340/172.5 |
| 4,868,832 | 9/1989 | Marrington et al. | . |
| 5,157,663 | * 10/1992 | Major et al. | 371/12 |
| 5,179,660 | 1/1993 | Devany et al. | . |
| 5,247,664 | 9/1993 | Thompson et al. | 707/10 |
| 5,535,326 | 7/1996 | Baskey et al. | 395/182.02 |

(List continued on next page.)

OTHER PUBLICATIONS

High Availability in Clustered Multimedia Servers (IEEE) Tewari, R; Dias, D. M.; Mukherzee, R; Vin, H. M., Mar., 1996.*

"Coda: A Highly Available File System for a Distributed Workstation Environment", Mahadev Satyanarayanan, et al., IEEE Transactions on Computers, vol. 39, No. 4, pp. 447–459, Apr., 1990.

(List continued on next page.)

Primary Examiner—Robert W. Beausoliel, Jr.
Assistant Examiner—Pierre E. Elisca
(74) Attorney, Agent, or Firm—Nickman Palerman Troung & Becker LLP; Brian D. Hickman

(57) ABSTRACT

A method and apparatus for configuring a software application on a cluster is provided. A configuration coordinator executing on a configuration manager communicates with one or more configuration slaves executing on a set of nodes that are operating as a cluster. The configuration coordinator sends messages to the one or more configuration slaves to initiate a configuration operation for a software application. Each configuration slave automatically performs a series of actions to configure the node on which it resides. When all the nodes complete the configuration operation for the software, the process is complete. While performing the series of actions, the configuration slaves generate logs that reflect their progress in performing the series of actions. If a problem occurs during performance of the series of actions, the configuration slave that encounters the problem indicates to the configuration coordinator that an error occurred. The configuration coordinator responds to the error by causing the configuration slaves to roll back changes made during performance of the series of actions. The configuration slaves that have begun but not completed the series of actions inspect their logs to determine which changes to roll back. By automatically configuring software on a cluster, and automatically rolling back changes on all cluster nodes in the event of an error during the configuration process, the cluster configuration process is made atomic, automatic, and significantly faster and less error-prone than manual cluster-wide configuration operations.

24 Claims, 4 Drawing Sheets

U.S. PATENT DOCUMENTS

| | | |
|---|---|---|
| 5,544,313 | 8/1996 | Shachnai et al. . |
| 5,566,225 | 10/1996 | Haas .................................... 455/423 |
| 5,566,297 * | 10/1996 | Devarakonda et al. ............... 714/15 |
| 5,596,720 | 1/1997 | Hamada et al. . |
| 5,633,999 * | 5/1997 | Clowes et al. ........................... 714/6 |
| 5,652,908 * | 7/1997 | Douglas et al. ......................... 714/3 |
| 5,666,479 | 9/1997 | Kashimoto et al. ................. 395/180 |
| 5,696,895 * | 12/1997 | Hemphill et al. ........................ 714/4 |
| 5,721,918 | 2/1998 | Nilsson et al. ....................... 707/202 |
| 5,734,896 | 3/1998 | Rizvi et al. . |
| 5,784,630 | 7/1998 | Saito et al. ........................... 395/800 |
| 5,796,934 | 8/1998 | Bhanot et al. .................. 395/182.02 |
| 5,796,999 | 8/1998 | Azagury et al. ..................... 395/600 |
| 5,819,019 | 10/1998 | Nelson .................................... 714/4 |
| 5,832,483 * | 11/1998 | Barker .................................... 707/9 |
| 5,850,507 | 12/1998 | Ngai et al. . |
| 5,862,362 | 1/1999 | Somasegar et al. ............ 395/500.42 |
| 5,867,713 * | 2/1999 | Shrader et al. ........................ 395/12 |
| 5,870,545 * | 2/1999 | Davis et al. ......................... 709/201 |
| 5,951,694 | 9/1999 | Choquier et al. ...................... 714/15 |
| 6,038,677 * | 3/2000 | Lawlor et al. ........................... 714/4 |
| 6,047,323 * | 4/2000 | Krause ................................. 709/227 |

OTHER PUBLICATIONS

"*Scalable, Secure, and Highly Available Distributed File Access*", Mahadev Satyanarayanan, Carnegie Mellon University, vol. 23 5, pp. 9–21, May, 1990.

"*Workload Balancing in a Distributed Enviroment,*" IBM Technical Disclosure Bulletin, Nov. 1995.

"*Local Area Network Server Replacement Procedure,*" IBM Technical Disclosure Bulletin, Jan. 1995.

\* cited by examiner

METHOD AND APPARATUS FOR FAIL SAFE CONFIGURATION

FIELD OF THE INVENTION

The present invention relates to configuring a cluster, and more specifically, to a method and apparatus for configuring on a cluster a software application that is not necessarily designed for execution on a cluster.

BACKGROUND OF THE INVENTION

A computer network typically includes a set of devices connected in a way that allows the devices to communicate with each other. Such devices, which can include workstations with memory and one or more processors, are often referred to as nodes. A cluster is a group of nodes that work together as a single system. One software application that allows groups of nodes to operate as a single system is NT Enterprise, which is generally available from Microsoft Corporation.

Clusters can be either "shared data" or "shared nothing" clusters. In a shared data cluster, all nodes have access to one or more shared storage devices. In a shared nothing cluster, storage devices are "owned" by nodes, and nodes only have access to the storage devices that they own.

In general, clustering technology is designed to minimize downtime for client/server network computing applications. Downtime may be minimized, for example, by shifting the responsibilities of a first node in the cluster to a second node in the cluster if the first node in the cluster fails. Shifting responsibilities in this manner is referred to as fail over. A node that assumes the responsibilities of another node in response to a fail over is referred to herein as a fail over node.

The responsibilities that a node is able to handle is determined in part by the software that is executing on the node. For example, a node may be able to process database requests because it is executing a database server. If the node fails, the responsibility for processing database requests can only be shifted to a fail over node that is able to execute the database server. Since the fail over node is not currently executing the database server, the database server must be started on the fail over node in response to the fail over. Techniques for performing automatic fail over in a client/server system are described in U.S. patent application Ser. No. 08/866,842 entitled "Automatic Failover for Clients Accessing a Resource Through a Server", filed on May 30, 1997, the contents of which are incorporated herein by reference.

Many software programs must be specifically configured for a node before they can be safely executed on the node. Configuring a software program may involve, for example, (1) configuring the network required to run the client/server based application, (2) configuring the application itself, and (3) configuring any other software that may be required for the application to run. The process of configuring a software program for a node can be complex and time consuming. It typically requires the user to manually perform a series of steps specified by the software provider. For sophisticated software programs, the steps can be both numerous and complex. Further, if one step in the configuration process fails, the entire configuration operation may have to be restarted.

Applications designed to run on a single node are generally referred to as stand alone applications. An application that runs in a cluster environment and is capable of fail over to another node in the cluster when the primary node fails is referred to as a fail safe application.

Before a stand alone application is configured for fail safe operation, the application can only run on one of the clustered nodes. This node is referred to as the owner node. Fail safe operation requires the application to be configured both on the owner node and on other nodes in the cluster so that the application can run on multiple nodes in the cluster to provide fail over capability.

In fail over systems, software programs must be configured on both (1) nodes that will initially execute the programs, and (2) nodes that may have to execute the programs if fail over occurs. Thus, depending on the fail over policies employed within a cluster, a given software program may have to be configured on all of the nodes in a cluster even though it is planned to be executed on only one of the nodes in the cluster at a time.

A configuration operation becomes exponentially more complex and time consuming the more nodes for which the program must be configured. Consequently, configuring applications for use on clusters that employ fail over can be prohibitively burdensome. For example, one software program has a forty-step configuration process. Configuring such a program on a relatively small cluster of nodes has taken an expert engineer approximately nineteen hours.

Based on the foregoing, it is clearly desirable to reduce the complexity of configuring software in clusters that employ fail over policies.

SUMMARY OF THE INVENTION

A method and apparatus for turning a stand alone application into a fail safe application automatically with minimum expertise required of the user of the application. According to one aspect of the invention, a configuration coordinator executing on a configuration manager communicates with one or more configuration slaves executing on a set of nodes that are operating as a cluster. The configuration coordinator sends messages to the one or more configuration slaves to initiate a configuration operation for a software application. The configuration coordinator generates log information to track which configuration slaves have initiated and completed configuration operations.

Each configuration slave automatically performs a series of actions to configure the node on which it resides. While performing the series of actions, the configuration slaves generate logs that reflect their progress in performing the series of actions. If a problem occurs during performance of the series of actions, the configuration slave that encounters the problem indicates to the configuration coordinator that an error occurred. The configuration coordinator responds to the error by causing the configuration slaves to roll back changes made during performance of the series of actions. The configuration slaves that have begun but not completed the series of actions inspect their logs to determine which changes to roll back.

By automatically configuring software on a cluster, and automatically rolling back changes on all cluster nodes in the event of an error during the configuration process, the cluster configuration process is made atomic, automatic, and significantly faster and less error-prone than manual cluster-wide configuration operations.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for automatically configuring software on a cluster is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
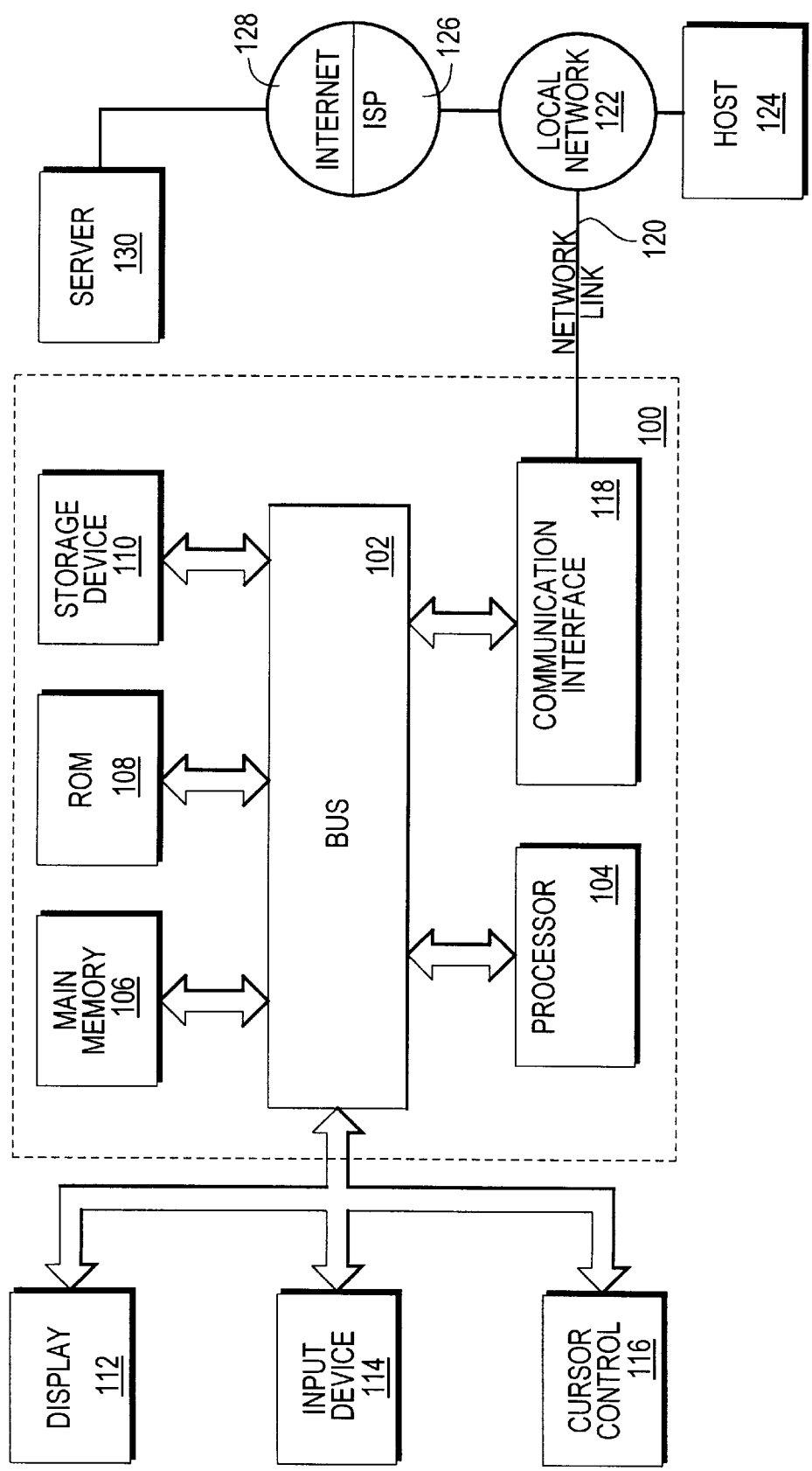
FIG. 1 is a block diagram of a computer system on which an embodiment of the present invention can be implemented.

FIG. 1 is a block diagram that illustrates a computer system 100 that represents a node upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for configuring a set of nodes to execute an application. According to one embodiment of the invention, automatic multi-node configuration is coordinated by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for automated configuration as described herein.

The received code may be executed by processor 104 as it is received, and/or stored in storage device 110, or other non-volatile storage for later execution. In this manner, computer system 100 may obtain application code in the form of a carrier wave.

EXEMPLARY CLUSTER

Figure 2:
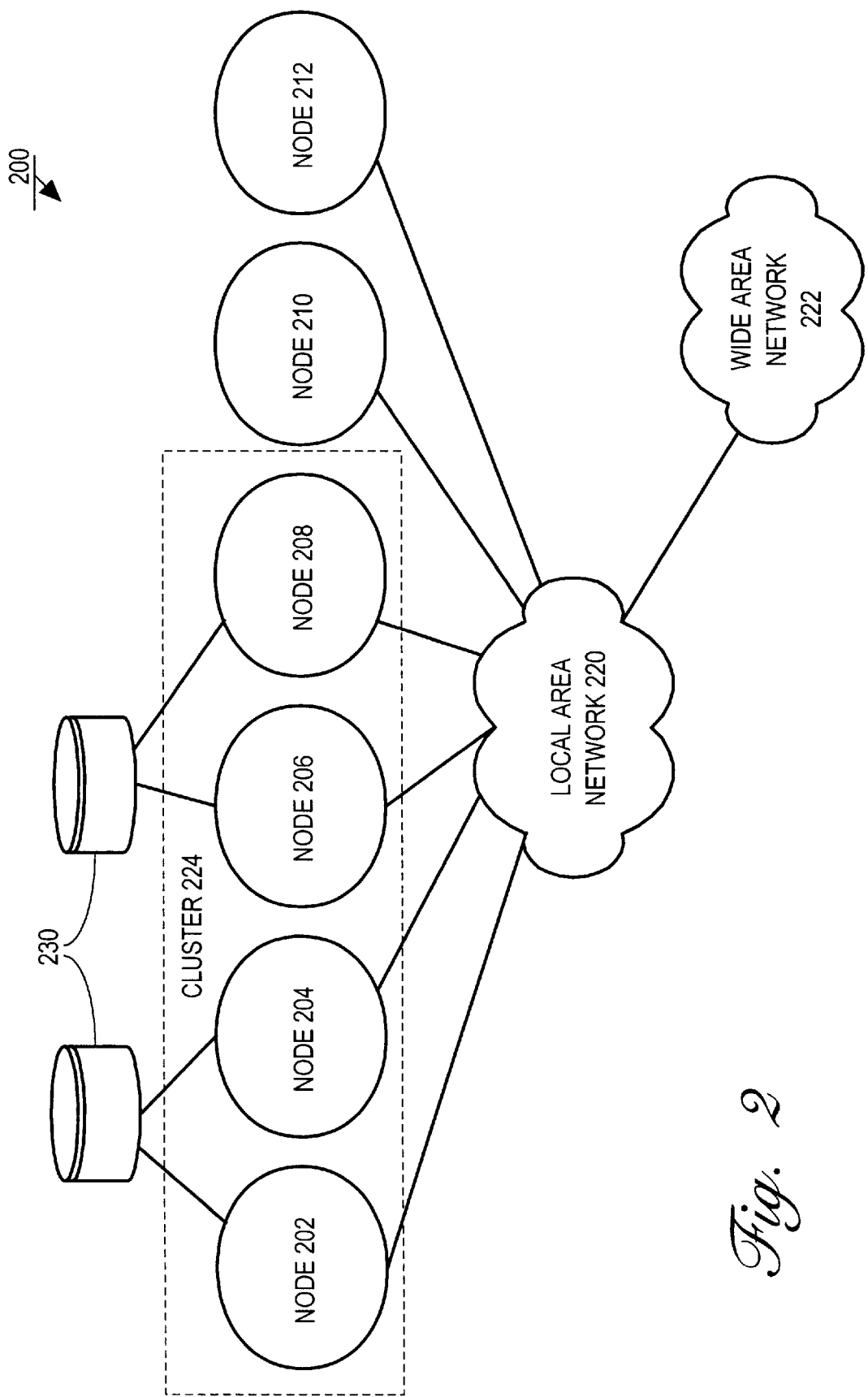
FIG. 2 is a block diagram of a computerized system that includes a cluster that may be configured to execute a software application using techniques provided by the present invention.

Referring to FIG. 2, it is a block diagram of a system 200 that includes a cluster 224. Cluster 224 includes nodes 202, 204, 206 and 208. The nodes of cluster 224 are connected through and communicate over a local area network 220. Local area network 220 also includes nodes 210 and 212 that are not part of cluster 224. Local area network 220 is connected to a wide area network 222, such as the Internet, thus allowing the nodes that belong to local area network 220 to communicate over long distances with other nodes (not shown).

In addition, the clustered nodes also connect to a set of common disks/storage systems 230. In a shared nothing cluster, each disk can only be accessed by one cluster node at a time, while in a shared disk cluster, all of the cluster nodes can access the common disks simultaneously.

It should be noted that the illustrated system 200 is merely exemplary. The actual number and type of nodes in the cluster, and the mechanism that allows communication between the nodes, may vary from implementation to implementation. The present invention is not limited to any particular type of node, cluster, or inter-node communication mechanism.

AUTOMATED ATOMIC CONFIGURATION

According to one embodiment of the invention, configuring a cluster is performed both automatically and atomically. The automated nature of the configuration process is achieved by causing various software entities, including a configuration coordinator and one or more configuration slaves, to perform the configuration steps on the various nodes of the cluster.

A set of actions is said to be "atomic" if techniques are used to guarantee that the set of actions are treated as an indivisible unit. Specifically, a set of actions is atomic when all of the actions in the set are performed if any action in the set is performed. The configuration process described herein is atomic in that an application is configured on either all of the necessary nodes or on none of the nodes. The atomic nature of the configuration process is achieved through the combination of progress tracking and a rollback mechanism. The configuration process shall now be described in greater detail with reference to FIG. 3.

Figure 3:
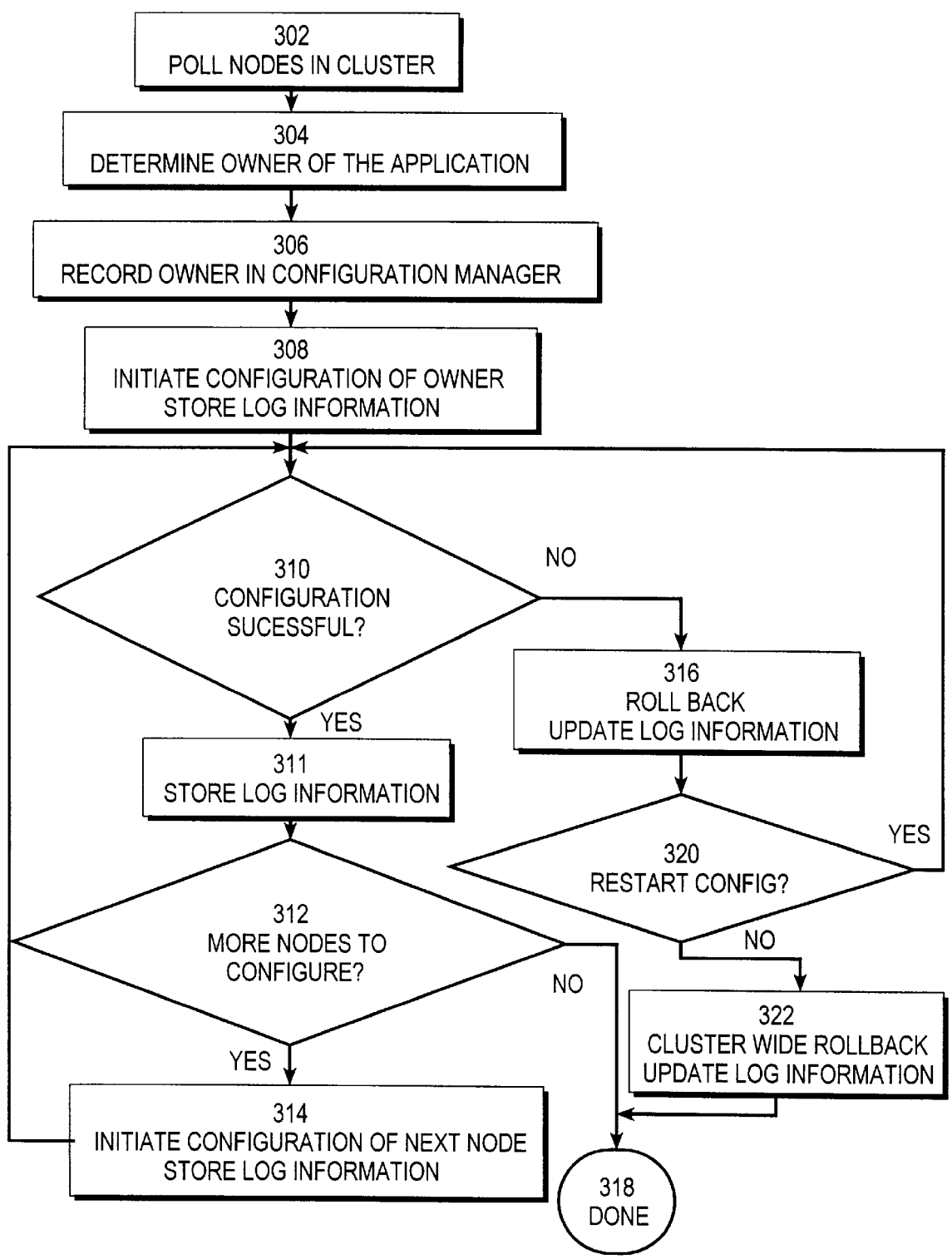
FIG. 3 is a flow chart illustrating steps for configuring a software program on a cluster according to an embodiment of the invention.

Referring to FIG. 3, it is a flow chart illustrating the steps performed by a process (the "configuration coordinator") to coordinate a configuration operation for an application according to an embodiment of the invention. Initially, a node is selected to be a configuration manager. The configuration manager executes the configuration coordinator. The configuration manager may be a node that belongs to the cluster being configured, or to a node that is able to communicate with the cluster. For the purposes of explanation, it shall be assumed that cluster 224 is being configured for an application called "APP1", and that node 210 has been designated as the configuration manager.

At step 302, the configuration coordinator polls each node in the cluster to find out which node has the given application configured as a stand alone application, and therefore is owner of the application. In response to being polled, the nodes in the cluster send the configuration coordinator information that indicates whether or not they are the owner of the given stand alone application. In the present example, a configuration coordinator process running on node 210 polls nodes 202, 204, 206 and 208 during step 302.

Based on the information retrieved during the polling process, at step 304 the configuration coordinator determines the owner of the application to be configured. At step 306 the owner is recorded in the configuration manager. In the present example, it shall be assumed that APP1 is configured as a stand alone application on node 202. Therefore, the configuration coordinator stores in node 210 data indicating that node 202 is the owner of APP1.

At step 308, the configuration coordinator initiates the configuration of the owner so that the application will run in the cluster environment as a fail safe application. The configuration coordinator generates log information to indicate that the configuration process has been initiated on the owner. According to one embodiment, the configuration coordinator initiates the configuration of the owner by invoking a slave process (a "configuration slave") on the owner. A configuration slave is software, executing as one or more processes, for automatically configuring a node for an application. A configuration slave may be designed for automatically configuring a node for one or more particular applications, or may be more generically designed for automatically configuring a node for any number and type of applications. In the latter case, the configuration slave receives input that specifies the particular configuration steps that must be performed for a given application.

The processes that implement a configuration slave may also perform other services. For example, according to one embodiment of the invention, the same processes that are used to implement fail over among nodes in the cluster also serve as configuration slaves to configure applications prior to fail over.

Referring again to FIG. 3, in response to step 308 the configuration slave automatically performs the steps required to configure the application on the owner. While the configuration slave is configuring the owner for the application, the configuration slave generates a log of its progress.

In the present example, it shall be assumed that steps S1, S2, S3 and S4 must be successfully performed to configure APP1 on a node. Therefore, the configuration coordinator initiates a configuration slave on node 202 to begin the configuration process on node 202. The configuration slave performs steps S1, S2, S3 and S4 on node 202 while generating a log to record its progress.

The actual steps that must be performed by the configuration slave will depend on the application being configured. The present invention is not limited to any particular application or type of application, and therefore is not restricted to any particular type or sequence of configuration steps.

At step 310 it is determined whether the configuration was successfully completed. The configuration is not successfully completed if, for example, the configuration coordinator receives a message from a configuration slave that the configuration slave was unable to successfully perform one of the configuration steps, or if the configuration coordinator fails to receive a response from a configuration slave after a predetermined period of time.

If the configuration was successfully completed, the configuration slave sends a "configuration complete" message to the configuration coordinator and control proceeds to step 311. At step 311, the configuration coordinator persistently stores log information in the configuration manager to record that configuration has been successfully performed on the owner. As shall be described in greater detail hereafter, the log information on the configuration manager is used both to determine when the cluster-wide configuration of an application has completed successfully, and to determine which nodes have to be rolled back if the cluster-wide configuration cannot be completed successfully.

After the owner has been successfully configured, the configuration coordinator gathers all the necessary configuration information from the application on the owner node and stores the information in a cluster-wide repository provided by the cluster application programming interface (API). This configuration data is used by all of the other nodes in the cluster to configure the application. After the log information is recorded on the configuration manager and the configuration information is stored in a cluster-wide repository, control passes to step 312.

According to one embodiment of the invention, a configuration slave deletes its configuration progress log when it completes its configuration steps. At that point the configuration slave simply keeps track of the configuration information that it will have to delete if it is asked to roll back the configuration operation.

In the present example, a configuration complete message is sent from node 202 to node 210 when the configuration slave successfully completes steps S1, S2, S3 and S4 on node 202. The configuration coordinator then persistently stores on node 210 a record that configuration of node 202 is complete.

Steps 310, 311, 312 and 314 form a loop where a configuration operation is performed for each node of the cluster that must be able to execute the application. The nodes that must be able to execute an application depend on the fail over policy that applies to the cluster. For example, a fail over policy may order the nodes of a cluster in a circular list and specify that if any node fails, its responsibilities will be assumed by the next node in the order. In this example, all of the nodes of the cluster will have to be able to execute all applications, since it is possible that all nodes but one will fail.

An alternative policy may divide the nodes of the cluster into "fail safe groups", where each group is ordered in a circular list. If any node fails, its responsibilities are assumed by the next node in the list for its group. Using this policy, all nodes within a fail safe group will have to be able to execute all programs that will run on any node in the group, but will not have to be able to execute programs that are executed on nodes that do not belong to the group.

According to one embodiment, the fail over policy is user-configurable. Consequently, a user can adopt a policy directed to specific needs and applications. The configuration coordinator receives input that indicates the applicable fail over policies and is thereby able to determine which nodes in the cluster have to be able to execute an application that is owned by a given node.

Step 314 is repeated for each node that must be configured for the application. During step 314, the configuration coordinator instructs a configuration slave on a node to begin configuration of the node. The configuration coordinator also generates log information to indicate the new node on which the configuration operation has been initiated. The configuration slave configures the node upon which it is executing and generates a log of its progress.

Once the node is configured, the configuration slave sends a configuration complete message to the configuration manager, where a record of the successful configuration of the node is persistently stored. This process continues for each node in the cluster that must be configured for the application until all the nodes in the cluster that have to be configured have been configured. When all of the nodes that have to be configured have been successfully configured, the configuration process ends at step 318.

For the purposes of explanation, it shall be assumed that cluster 224 implements a fail over policy that requires all nodes in the cluster to be able to execute APP1. Therefore, the configuration coordinator on node 210 invokes configuration slaves on nodes 204, 206 and 208. As each configuration slave performs steps S1, S2, S3 and S4, it records its progress. When each configuration slave completes, the configuration slave sends to the configuration coordinator a message indicating that it has completed the configuration of its node. The configuration coordinator stores log information on node 210 to record which nodes have completed the configuration process.

After node 210 has received messages indicating successful configuration from all of the nodes 204, 206 and 208, the configuration coordinator updates the log information at node 202 to indicate that the cluster-wide configuration operation was successful. At this point, the configuration coordinator may optionally send messages to terminate each of the configuration slaves.

According to the flow chart in FIG. 3, configuration on one node is not initiated until configuration of the previous node is completed. However, in alternative embodiments, the configuration coordinator does not wait for nodes to be configured before initiating the configuration process on other nodes. Thus, multiple configuration slaves can configure multiple nodes in parallel, thus reducing the time required to complete the configuration process.

To the extent that configuration steps do not have to be performed sequentially, configuration slaves may be implemented by multiple processes executing in parallel to further reduce configuration time. For example, if S1 and S2 can be performed in any order, then a configuration slave performing S1 and S2 can spawn two processes to execute S1 and S2 in parallel. The benefit of distributing configuration tasks between multiple processes hinges on the availability of hardware that supports parallel processing. Therefore, configuration slaves may be configured to spawn multiple configuration processes if hardware on a node supports parallel processing, and to perform all configuration steps with a single process if hardware on the node does not support parallel processing.

FAILURE DURING CONFIGURATION

At any time during the configuration, the configuration or system may fail. When a failure occurs, control passes from step 310 to step 316. During step 316, configuration operations on one or more nodes are rolled back and the log information maintained by the configuration coordinator is updated to reflect the roll back.

A configuration operation is rolled back by removing changes made during the configuration operation. For example, assume that power goes out on node 206 after the configuration slave on node 206 has performed steps S1 and S2. After power is returned to node 206, the aborted configuration operation on node 206 is rolled back by removing the changes made during the performance of S1 and S2.

At step 320 it is determined whether the reconfiguration process for the current node should be restarted. Whether the reconfiguration process should be restarted on the current node depends on the type of error encountered. If the error is unrecoverable, then control passes to step 322. Otherwise, reconfiguration of the current node is restarted and control passes to step 310. When restarted, log information is generated to indicate that the configuration operation has been restarted.

Significantly, the entire configuration process does not need to start over after every failure. The configuration process can be restarted at the last step where a configuration complete message was received by and recorded at the configuration manager. For example, if nodes 202 and 204 have sent configuration completion messages to node 210 prior to a system failure, then the record that those nodes are configured will persist in the log information on node 210 after the failure. Upon reading the log information, the configuration coordinator will know that nodes 202 and 204 have been successfully configured. Therefore, configuration will only have to be restarted at nodes 206 and 208.

CLUSTER-WIDE ROLL BACK

When configuration fails due to an unrecoverable error, control passes to step 322 where the configuration process is rolled back at all nodes of the cluster. This may occur, for example, if prerequisite software needed to run the application being configured is missing or if a node does not have enough memory to execute an application. After cluster wide rollback, the configuration operation is not automatically restarted.

For example, assume that node 206 does not have enough memory to execute APP1. Merely rolling back and restarting the configuration process on node 206 will not solve this problem. Therefore, a cluster-wide configuration roll back is performed and a diagnosis of the problem is sent to the configuration coordinator. A user at the configuration manager may inspect the diagnosis, correct the problem, and then restart the configuration process.

Upon detecting an error that requires cluster-wide roll back, the configuration coordinator transmits rollback messages to all nodes on which configuration has been initiated. In response to the rollback messages from the configuration coordinator, the changes caused by any previously executed configuration steps are removed from the various nodes. Specifically, each configuration slave responds to a rollback message by removing from its node the changes made to its node up to that point during the configuration operation. For configuration slaves that have already completed the configuration process on their nodes, rollback of a non-owner node may simply involve deleting configuration files that were generated during the configuration of the node. On the owner node, rollback involves configuring the application to run on the node as a standalone application again.

Upon finishing rollback, a configuration slave sends a "rollback complete" message to the configuration coordinator. When the configuration coordinator receives a rollback complete message from a configuration slave, the rollback coordinator updates the log information on the configuration manager to indicate that the node associated with the configuration slave has been rolled back. When the configuration coordinator has received a rollback complete message from all of the nodes that required roll back, the cluster-wide rollback operation is complete.

Figure 4:
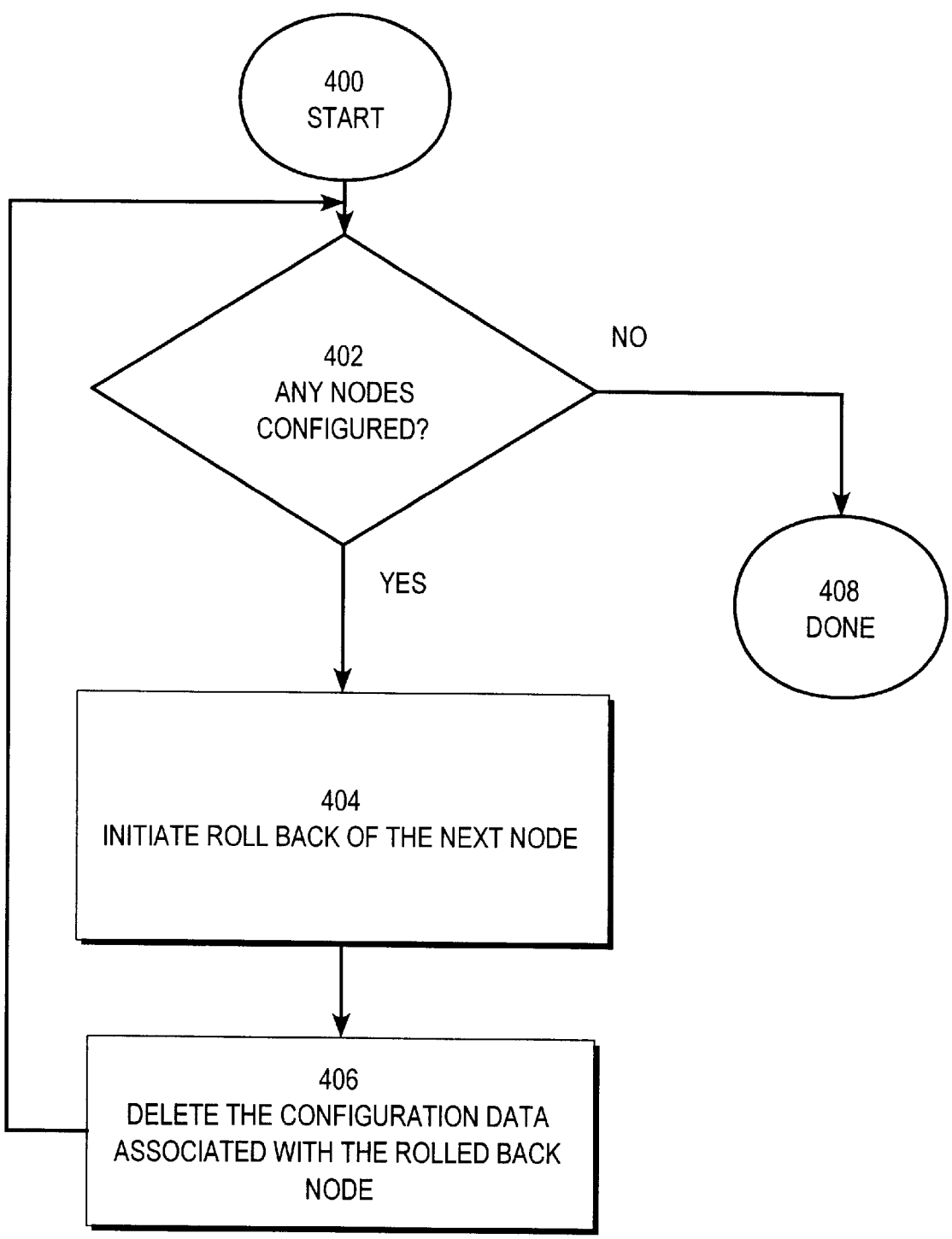
FIG. 4 is a flow chart illustrating steps for performing a cluster-wide roll back according to an embodiment of the invention.

Referring to FIG. 4, it is a flow chart illustrating steps for cluster wide rollback according to an embodiment of the invention. FIG. 4 illustrates a cluster wide roll back in which the nodes are rolled back sequentially, rather than in parallel. However, the present invention is not limited to sequential roll back.

Cluster wide roll back begins at step 400 and proceeds to step 402 where it is determined whether any nodes in the cluster are still configured. If not, all of the nodes have already been rolled back and roll back is done (step 408).

Otherwise, a configured node is selected to be rolled back, and roll back of the selected node is initiated at step 404. When roll back of the selected node is completed, the configuration data for the node is deleted at step 406. Steps 402, 404 and 406 define a loop during which each node is rolled back and the configuration data for each node is deleted when the roll back of the node is complete. This loop continues until all nodes have been rolled back and all configuration data has been deleted.

APPLICATION VERIFICATION

According to one embodiment of the invention, the configuration slaves extend the configuration process beyond the provider-specified configuration steps to include application verification. During application verification, an application is executed on a node to determine whether it has been accurately configured for the node.

For example, after performing steps S1, S2, S3 and S4, a configuration slave that is configuring APP1 on a node will perform the additional step (S5) of verifying APP1 on the node. If APP1 executes correctly on the node, the configuration slave reports to the configuration coordinator that the configuration was successful. If APP1 does not execute as expected, then the configuration slave rolls back all of the configuration steps (S1, S2, S3, S4 and S5) and sends a message to the configuration coordinator to indicate that the configuration failed.

In embodiments that extend the configuration process to include application verification, parallelism during the cluster configuration process may be reduced. Specifically, some applications may not support concurrent execution on multiple nodes, particularly in shared nothing clusters. Therefore, under these conditions, application verification among the various nodes must be performed by each configuration slave serially relative to the other configuration slaves.

Significantly, the applications that are configured according to the techniques described herein need not be aware that they are executing on a cluster. The cluster-wide configuration is automatically performed by the configuration coordinator and one or more configuration slaves. Similarly, fail over may be automatically performed by separate fail over software. Consequently, applications designed for single node operation do not have to be modified to be used in a clustered, fail-safe environment.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for configuring a software application to run on a cluster that includes a plurality of nodes, the method comprising the steps of:
   identifying, based on one or more fail over policies that apply to said cluster, a set of nodes that belong to the cluster that must be able to execute the software application;
   causing a plurality of configuration slaves to automatically perform a series of actions required to configure said software application on said set of nodes; and
   generating data indicating that said software application has successfully been installed on said cluster when said configuration slaves successfully complete said series of actions.

2. The method of claim 1 further comprising the steps of:
   causing said plurality of configuration slaves to generate logs to indicate progress while performing said series of actions; and
   if a failure occurs before all configuration slaves of said plurality of configuration slaves complete said series of actions, then causing all of said configuration slaves to undo changes made during performance of said series of actions.

3. The method of claim 1 further comprising the steps of:
   polling one or more nodes of said cluster to identify an owner of said software application; and
   identifying said set of nodes based on said owner and fail over policies that apply to said owner.

4. The method of claim 1 wherein said step of causing a plurality of configuration slaves to automatically perform a series of actions is performed by a configuration coordinator executing on a computer system.

5. The method of claim 4 wherein said configuration coordinator causes said configuration slaves to automatically perform said series of actions using a cluster wide repository to store configuration information, wherein configuration slaves on said plurality of nodes have access to said configuration information on said cluster wide repository.

6. The method of claim 4 wherein:
   a configuration slave of said plurality of configuration slaves sends a first message to said configuration coordinator if a failure occurs while said configuration slave performs said series of actions;
   said configuration coordinator responds to said first message by sending a set of second messages to configuration slaves on the nodes on which said series of actions have been started; and
   all configuration slaves that receive said second messages respond to said second messages by undoing changes made during performance of said series of actions.

7. The method of claim 6 wherein the configuration slave that encountered the failure sends to the configuration coordinator information about said failure.

8. The method of claim 1 wherein the step of causing a plurality of configuration slaves to automatically perform a series of actions includes causing said configuration slaves to test said software application on said set of nodes.

9. The method of claim 1 wherein:
   the step of causing a plurality of configuration slaves to automatically perform a series of actions is performed by causing a configuration coordinator to send messages to each of said plurality of configuration slaves;
   said configuration slaves perform said series of actions in response to said messages; and
   said configuration coordinator causes said set of nodes to be configured in a serial operation by sending a message to a next configuration slave only after being informed that a previous configuration slave has successfully completed said series of actions.

10. The method of claim 1 wherein:
    the step of causing a plurality of configuration slaves to automatically perform a series of actions is performed by causing a configuration coordinator to send messages to each of said plurality of configuration slaves;
    said configuration slaves perform said series of actions in response to said messages; and
    said configuration coordinator causes said set of nodes to be configured in a parallel operation by sending a message to a next configuration slave before being informed that a previous configuration slave has successfully completed said series of actions.

11. A computer-readable medium carrying one or more sequences of instructions for configuring a software application to run on a cluster that includes a plurality of nodes, wherein execution of the one or more sequences of instructions by one or more processors causes the one or more processors to perform the steps of:
    identifying, based on one or more fail over policies that apply to said cluster, a set of nodes that belong to the cluster that must be able to execute the software application;
    causing a plurality of configuration slaves to automatically perform a series of actions required to configure said software application on said set of nodes; and
    generating data indicating that said software application has successfully been installed on said cluster when said configuration slaves successfully complete said series of actions.

12. The computer-readable medium of claim 11 further comprising instructions for performing the steps of:
    causing said plurality of configuration slaves to generate logs to indicate progress while performing said series of actions; and
    if a failure occurs before all configuration slaves of said plurality of configuration slaves complete said series of actions, then causing all of said configuration slaves to undo changes made during performance of said series of actions.

13. The computer-readable medium of claim 11 further comprising the instructions for performing the steps of:
    polling one or more nodes of said cluster to identify an owner of said software application; and
    identifying said set of nodes based on said owner and fail over policies that apply to said owner.

14. The computer-readable medium of claim 11 wherein said step of causing a plurality of configuration slaves to automatically perform a series of actions is performed by a configuration coordinator executing on a computer system.

15. The computer-readable medium of claim 14 wherein:
a configuration slave of said plurality of configuration slaves sends a first message to said configuration coordinator if a failure occurs while said configuration slave performs said series of actions;
said configuration coordinator responds to said first message by sending a set of second messages to configuration slaves on the nodes on which said series of actions have been started; and
all configuration slaves that receive said second messages respond to said second messages by undoing changes made during performance of said series of actions.

16. The computer-readable medium of claim 15 wherein the configuration slave that encountered the failure sends to the configuration coordinator information about said failure.

17. The computer-readable medium of claim 11 wherein the step of causing a plurality of configuration slaves to automatically perform a series of actions includes causing said configuration slaves to test said software application on said set of nodes.

18. The computer-readable medium of claim 11 wherein:
the step of causing a plurality of configuration slaves to automatically perform a series of actions is performed by causing a configuration coordinator to send messages to each of said plurality of configuration slaves;
said configuration slaves perform said series of actions in response to said messages; and
said configuration coordinator causes said set of nodes to be configured in a serial operation by sending a message to a next configuration slave only after being informed that a previous configuration slave has successfully completed said series of actions.

19. The computer-readable medium of claim 11 wherein:
the step of causing a plurality of configuration slaves to automatically perform a series of actions is performed by causing a configuration coordinator to send messages to each of said plurality of configuration slaves;
said configuration slaves perform said series of actions in response to said messages; and
said configuration coordinator causes said set of nodes to be configured in a parallel operation by sending a message to a next configuration slave before being informed that a previous configuration slave has successfully completed said series of actions.

20. A computerized system comprising:
a plurality of nodes coupled to permit communication among said plurality of nodes;
said plurality of nodes including a first set of nodes operating as a cluster;
a configuration coordinator executing on a configuration manager, wherein said configuration manager includes at least one of said plurality of nodes;
one or more configuration slaves executing on a second set of nodes, wherein each node in said second set of nodes belongs to said first set of nodes;
said configuration coordinator being configured to send messages to said one or more configuration slaves to initiate a configuration operation for a software application;
each configuration slave of said one or more configuration slaves automatically performing a series of actions to configure the node of said second set of nodes on which said configuration slave resides; and
in response to being informed that one or more configuration slaves encountered a problem during performance of said series of actions, the configuration coordinator causes said configuration slaves to roll back changes made during performance of said series of actions.

21. The computerized system of claim 20 wherein:
while performing said series of actions, the one or more configuration slaves are configured to generate logs that reflect progress of performing said series of actions;
the one or more configuration slaves are configured to indicate to the configuration coordinator when a problem occurs during performance of said series of actions; and
in response to being informed that one or more configuration slaves encountered a problem during performance of said series of actions, the configuration slaves that have begun but not completed said series of actions inspect said logs to determine which changes to roll back.

22. A method for configuring a software application to run on a cluster that includes a plurality of nodes, the method comprising the steps of:
causing a plurality of configuration slaves to automatically perform a series of actions required to configure said software application on said plurality of nodes;
generating data indicating that said software application has successfully been installed on said cluster when said configuration slaves successfully complete said series of actions; and
causing all of said configuration slaves to undo changes made during performance of said series of actions if a failure occurs before all configuration slaves of said plurality of configuration slaves complete said series of actions.

23. The method of claim 22 wherein the step of causing a plurality of configuration slaves to automatically perform a series of actions includes causing said configuration slaves to test said software application on said plurality of nodes.

24. The method of claim 22 further comprising the steps of:
polling one or more nodes of said cluster to identify an owner of said software application; and
using said owner to determine a set of nodes that belong to the cluster that must be able to execute the software application.

* * * * *